March 19, 1935.     L. DE FLOREZ ET AL     1,994,757
APPARATUS FOR INDICATING AND/OR CONTROLLING PHYSICAL CHANGES
Filed Feb. 10, 1931
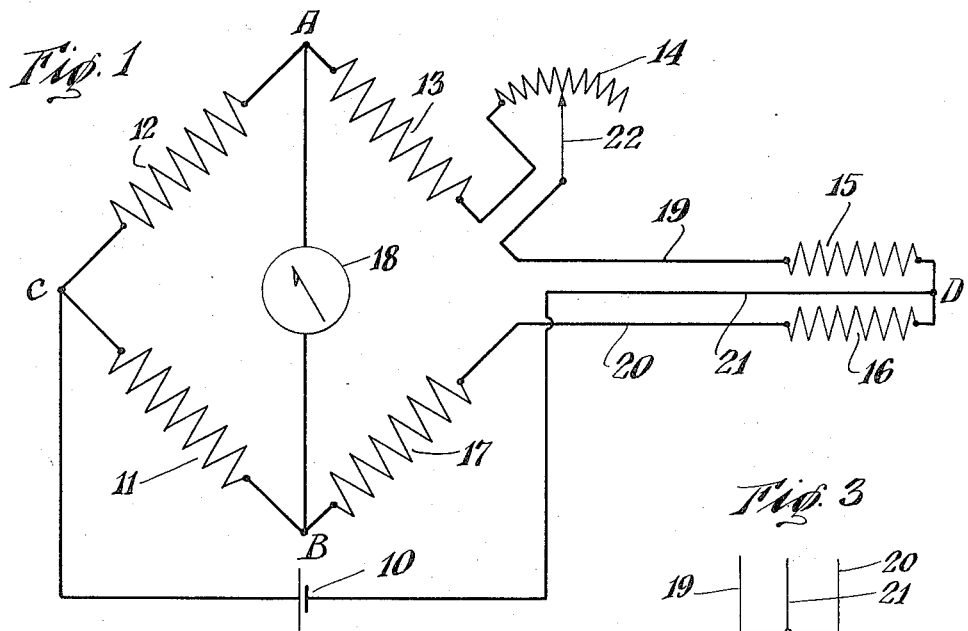
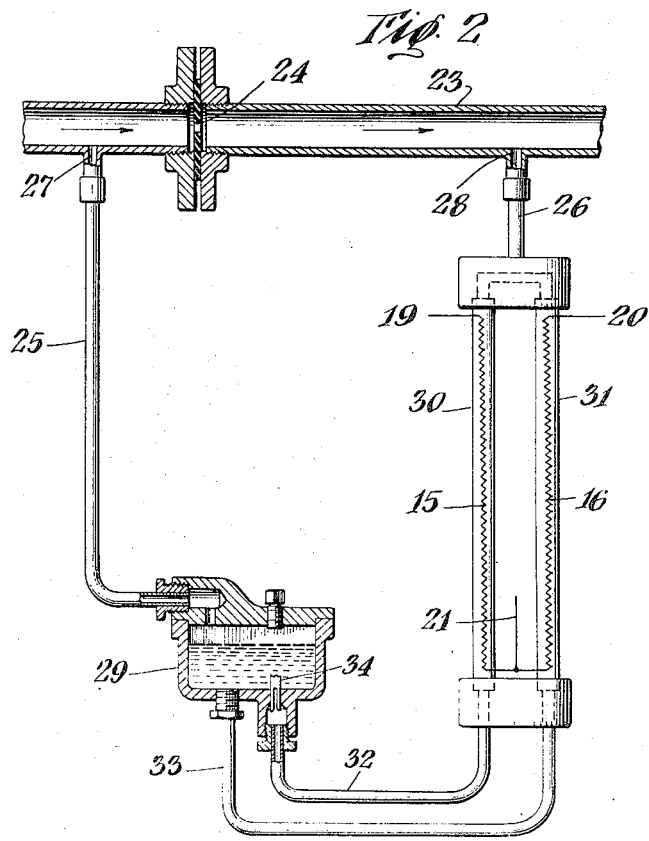
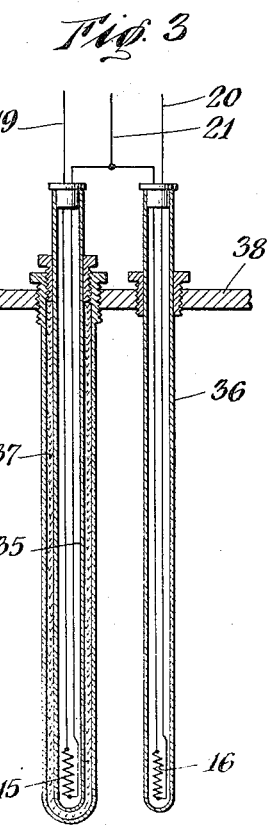
INVENTORS
Luis de Florez
BY Emmon Bach
Hoguet & Neary
ATTORNEYS Patented Mar. 19, 1935

1,994,757

UNITED STATES PATENT OFFICE 1,994,757

APPARATUS FOR INDICATING AND/OR CONTROLLING PHYSICAL CHANGES

Luis de Florez, Pomfret, Conn., and Emmon Bach, New York, N. Y.; said Bach assignor to said de Florez Application February 10, 1931, Serial No. 514,786

9 Claims. (Cl. 73—32)

This invention relates to apparatus for indicating, recording and controlling physical changes. In its broader and more general aspects the invention is concerned with apparatus responsive to the rate as well as the degree of physical changes in a system communicating therewith. More particularly the invention provides a novel control system actuated directly by physical changes associated with changes in the physical condition of a communicating system and operating through an electrical resistance differential, established by such changes, to effect regulatory operations.

In many industrial processes it is essential to the operation that substantially constant physical conditions be maintained during the operation period. In such processes, the zone of desired constant physical condition is usually remote in distance and/or time from the point in the process cycle at which regulatory operations are effected. This condition gives rise to a characteristic time lag between the initiating of a regulatory operation and the response thereto in the regulated zone. It is therefore desirable that a control system should operate to compensate such regulatory lag in order that substantially immediate response to regulatory operations may be occasioned in the zone under control. In the present invention, such compensation is attained by introducing the factor of rate as well as the factor of magnitude into the control system, and by providing a control apparatus responsive to both of these factors.

In the accompanying drawing (like reference characters denoting like parts),

Figure I is a wiring diagram of a modified Wheatstone bridge in which the variation in the resistance of certain elements is produced by physical changes in a communicating system;

Figure II is a line drawing of a device for translating fluid flow rate changes into resistance changes in specified elements of the electrical system illustrated in Figure I; and Figure III is a line drawing showing one method of translating temperature changes into resistance changes in specific elements of the electrical system illustrated in Figure I.

Referring now to Figure I, 10 is a source of electric current connected, at the points C and D, to an electrical potential divider, such as, for example, the Wheatstone bridge arrangement A—C—B—D—A. The elements 11 and 12 are fixed resistances of equal value forming respectively the arms B—C and A—C of the bridge. The element 13, which is also a fixed resistance, is connected in series with the rheostat 14 and the variable resistance 15 to form the arm A—D of the bridge. The remaining arm B—D comprises the variable resistance 16 and the fixed resistance 17, which fixed resistance is of the same value as the element 13. An electrical instrument 18 responsive to current impulses is connected between the points A and B to indicate differences in potential therebetween. This instrument may, for example, comprise a galvanometer, in which case 10 is a source of direct current. The total available resistance in the element 16 is greater than the total available resistance in the element 15. As will appear more fully hereinafter, the effective resistances of the elements 15 and 16 should vary in accordance with variations in the desired physical condition of the communicating system, and the effective resistances of said elements 15 and 16 should bear the same ratio for any static value of said physical condition, assuming that a sufficient time has elapsed for a complete response of said elements to said static condition. The total available resistance of the rheostat 14 is sufficient to balance the difference in resistance between the elements 16 and 15 respectively, under any set of operating conditions in any adaptation of the invention, in order that the Wheatstone bridge may be electrically balanced when desired.

Communication, between the electrical control system and a system to be regulated, is established and maintained through the variable resistance elements 15 and 16. The effective magnitude of the said resistances during the operation of the control system is determined by the physical condition of the communicating system as hereinafter explained. The manner of communication will therefore depend upon the particular physical factor through which the said resistances are varied, in direct or indirect response to physical changes in the external system. In Figure II is shown an illustrative method of varying the effective resistance of the elements 15 and 16 respectively, through the medium of volume and volume changes, in indirect response to rate conditions obtaining during the flow of fluid through a conduit. It is to be understood, however, that the invention is in no wise limited to the specific adaptation shown.

Referring now to Figure II, 23 is a fluid conduit carrying the section of restricted area 24 (which in the drawing takes the form of an orifice plate). Communicating with the fluid conduit 23 are the pipes 25 and 26 connected thereto, at the points 27 and 28, before and after the orifice respectively. The location of the points 27 and 28 with respect to section of restricted area 24 will depend, in any particular assembly, upon the type of restricted area section used and the dimensions of the conduit, in order that the difference in static pressure between the two points 27 and 28 may accurately measure the rate of fluid flow.

The pipe 25 connects, at its lower end, with a mercury reservoir 29 while the pipe 26 establishes communication between the fluid conduit 23 and the glass tubes 30 and 31. Leading from the bottom of the mercury reservoir 29 are the pipes 32 and 33 establishing communication between the said reservoir and the lower ends of the tubes 30 and 31 respectively. The variable resistance elements 15 and 16, shown in the wiring diagram Figure I, are located respectively in the tubes 30 and 31. Comparing Figures I and II, it will be seen that the lead wires 19 and 20 respectively are identified as sections of the Wheatstone bridge arms A—D and B—D, while the lead wire 21 connects with the battery 10. An adjustable regulating valve 34 is placed at the point of connection between the mercury reservoir 29 and the pipe 32 leading to the tube 30. During the operation of the device this valve is partially closed, thus retarding the inter-flow of mercury between the said reservoir and the tube 30. The function of this valve with respect to the operation of the electrical control system will be more fully described hereinafter. The specific application of the invention to flow control in connection with the form of device shown in Figure II necessitates an equality between the ratio of the total available resistance of the elements 15 and 16 and the ratio of the resistances thereof per unit of length. These two elements may therefore conveniently take the form of wires of equal length but of different constant cross-sectional area.

When the invention is adapted, as in Figure II, to the indication and/or control of fluid flow, the rheostat 14 is calibrated in terms of fluid flow rate, over a predetermined range, and the regulating valve 34 is adjusted to establish a desired time lag between the respective responses of the mercury in the tubes 30 and 31 to changes in static pressure occasioned by changes in the rate of fluid flow through the conduit 23. The control system is then set to maintain a predetermined flow rate datum level by moving the contact arm 22 to a position on the rheostat 14 corresponding thereto, and the Wheatstone bridge will be in electrical balance as long as the fluid flow rate in the conduit 10 remains at the datum level. Under such conditions, the mercury columns in the tubes 15 and 16 will stand at a common level corresponding to the desired fluid flow rate, and the difference between this level and the mercury level in the reservoir 29 will measure said flow rate. Since the Wheatstone bridge is in electrical balance the effective resistance of the element 16 is equal to the sum of the effective resistances of the element 15 and the rheostat 14, these three elements being the only variable resistances in the circuit.

When the apparatus is assembled in the manner depicted in Figures I and II, the effective resistance of the elements 15 and 16 will vary inversely as the fluid flow rate. An increase in fluid flow rate effects an increase in the pressure differential across the orifice 24 and consequently causes the mercury to rise in the tubes 30 and 31, thus decreasing the resistance in the bridge circuit at the elements 15 and 16. The unit resistance of the element 15 is, however, less than that of the element 16, and hence the effective resistance at 16 will decrease more than the effective resistance at 15, if the mercury rises the same amount in each tube in response to an increase in fluid flow rate. If the rheostat setting is fixed, the bridge will be electrically unbalanced by such a change in fluid flow rate, and a difference in potential is thereupon established between the points A and B, causing a current to flow through the instrument 18. For a positive change in fluid flow rate, this current will flow from A to B since the resistance in the arm B—D of the Wheatstone bridge will then be less than that of the arm A—D. Conversely a decrease in fluid flow rate will cause a current to flow from B to A, since the potential difference is negative from A to B in this instance. In other words, whenever the two mercury columns stand at a common level, other than the predetermined datum level, a difference in potential will be established (and a current will flow) between the points A and B, the magnitude and direction of which will proportionately measure the actual change in fluid flow rate which has occurred. The relative magnitude of the said potential difference will of course depend upon the ratio between the unit resistances of the elements 15 and 16.

In order that the system may function in accordance with the rate as well as the degree of fluid flow rate change, and, further, to provide for compensating the characteristic regulatory lag of the process or system under control, the valve 34 is placed in the line 32 connecting the mercury reservoir 29 with the tube 30. The said valve is adjustable and serves to delay the full movement response of the mercury column in the tube 30 to fluid flow rate changes. The interflow of mercury between the reservoir 29 and the tube 31 is unrestricted, and thus changes in the pressure differential across the orifice 24 are reflected immediately to their full extent in this tube, while the mercury level manifestations of such changes in the tube 30 are delayed. Thus changes in the effective resistance of the element 16, responsive to fluid flow rate changes, occur in advance of corresponding changes at the element 15. Consequently, the initial resistance differential established in the electrical control system, at a time of fluid flow rate change in the conduit 23, is more than a proportionate measure of such change, and the resultant potential difference between A and B represents a magnification thereof. The percentage magnification involved will be determined by the ratio of the unit resistances of 15 and 16, and the actual amount of magnification produced at any instant of fluid flow rate change will be a function of the rate of such change. The setting of the valve 34 also affects the magnification of the potential difference between A and B, by determining the time lag between the movement responses of the mercury columns in the tubes 30 and 31 respectively.

When the present invention is used to control the flow of fluids, the deflections of the galvanometer 18 will indicate the changes in operating conditions necessary to re-establish the predetermined rate of flow. For example, the fluid in the conduit 23 may be flowing from a converter (not shown) and the rate of flow in the conduit may be regulable by the adjustment of the fuel supply to the converter. The control system is static as long as the rate of fluid flow in the conduit 23 is constant at a value corresponding to the setting at the rheostat 14. Under such datum level conditions the mercury columns in the tubes 30 and 31 stand at a common level indicative of the datum level flow rate and the Wheatstone bridge is balanced. If a sudden increase in flow occurs, the pressure differential across the orifice 24 will likewise increase and the mercury in the tube 31 will rise in response to the pressure differential increase, the instantaneous level points of the rising mercury column measure corresponding instantaneous values of the changing fluid flow rate, and a reduction in the effective resistance of the element 16 results. The Wheatstone bridge is consequently unbalanced and a current will flow through the instrument 18. The resulting deflection of the galvanometer will then indicate the degree of change in fuel supply necessary to initiate a return to predetermined fluid flow conditions regulating operation through the auxiliary fuel supply control valve (not shown).

The mercury column in the tube 30 is also affected by the fluid flow rate change, but the full movement response of said column thereto is delayed by reason of the retarded flow of mercury through the valve 34. Therefore at the initial moment of fluid flow rate increase, the mercury in the tube 30 will remain at the datum level, while the mercury in the tube 31 will rise to a new level reflecting the instantaneous value of the increased fluid flow, and the differential of effective resistance between the arms A—D and B—D respectively of the Wheatstone bridge is more than proportionate to the actual flow increase which has occurred. The current flowing through the instrument 18 will likewise be magnified and the fuel supply will be decreased more than is proportionately necessary to compensate for the actual flow increase. The effect of such a magnified reaction, in the control system, to the flow rate increase in the conduit 23, is to initiate a return to normal at an abnormal rate, with a collateral compensation of the characteristic regulatory lag in the flow system. The mercury column in the tube 30 tends, however, to assume the same level as the corresponding column in the tube 31, since the two columns are acted upon by the same ultimate pressure. Consequently a gradual reduction in the magnitude of the current initially flowing through the instrument 18 takes place, tending to abate the initial over-correction at the point of fuel supply.

Since the mercury column in the tube 31 responds immediately to changes in fluid flow rate, the level in this tube will begin to recede as soon as the fluid flow rate in the conduit 23 stops increasing and begins to return to normal under the corrective influence of the decrease in fuel supply. The effect of this decrease in the rate of fluid flow is not felt immediately in the tube 30, and hence the difference in level between the two tubes will diminish at a relatively rapid rate during the early stages of the regulatory period. This reaction results in a further compensation of the initial over-correction of fluid flow rate until the heights of the mercury columns in the tubes 30 and 31 respectively are equal at some point above the datum level. At this point the flow rate regulation is proportionate to the deviation from normal thereof and the magnification in the corrective operation is zero. The fluid flow rate is, however, still above its normal datum level, although the mercury columns in the tubes 30 and 31 are at a common level, and hence continues to decrease at a gradually diminishing rate. As the return to normal continues, the change in the effective resistance of the element 16 (which change always leads the corresponding change in the element 15) will cause the differential of resistance between the arms A—D and B—D in the Wheatstone bridge, to pass through a value of zero (at which no current will flow through the instrument 18) to a negative value (relative to the differential initially established in the bridge) causing a current to flow through the instrument 18 in the direction B—A. This reversal in direction of the current through the instrument 18 will cause a somewhat magnified increase in fuel supply while the fluid flow is still above normal, thus opposing, by such action, the return to normal of the fluid flow rate and consequently tempering the rate of such return. Since the difference in level between the mercury columns in the tubes 30 and 31 is a function of the rate at which the fluid flow rate in the conduit 23 is changing, the said difference in level will be relatively small during the last stages of the regulatory period and will gradually re-attain a zero value when such period is completed, at which time the mercury in each tube will be at the datum level. The fluid flow rate is thus readjusted to its normal value after an increase without dropping below said normal value during the readjustment period, thereby eliminating the undesirable phenomenon of "hunting" common to many control systems.

In the event that the initial change in fluid flow rate is a decrease rather than an increase, the responsive and corrective changes in the control system will of course be opposite in direction, to those referred to in the preceding description, at the various stages of the regulatory period. The functioning of the invention will, however, be the same in either case.

Figure III relates to the adaptation of the present invention to the indication and/or control of temperature and temperature changes. When used in this connection, the functional characteristics of the method and apparatus are the same as discussed in connection with the adaptation illustrated in Figure II, and the wiring diagram depicted in Figure I is applicable to both cases.

Referring now to Figure III, 35 and 36 are metallic thermo-wells projecting, through the wall 38 of a furnace or industrial vessel, into a desired process temperature zone. The well 35 is surrounded with thermal insulation 37 and carries the resistance element 15 while the well 36 is thermally uninsulated and carries the resistance element 16. The said resistance elements, together with the lead wires 19, 20, and 21, are identified in the wiring diagram, Figure I, as the respective sections of the Wheatstone bridge designated by like reference characters.

The full resistance of the element 16 is larger than the full resistance of the element 15 (when both elements are at the same temperature). It is not necessary that the resistances of the two said elements per unit of length be in the same ratio as the full resistances thereof since variation of resistance in the elements 15 and 16 respectively is actuated by temperature changes which affect the entire element rather than by a factor (such as volume in Figure II) which varies the effective resistance of the said elements by varying the proportion thereof incorporated in the Wheatstone bridge circuit. The two elements 15 and 16 should, however, have the same resistance-temperature coefficient, and hence the ratio of the resistances of the two elements when both are at the same temperature will be constant for any temperature. In other words, for both modifications of our invention, the effective resistances of the two elements possess a constant ratio under equilibrium or static conditions.

In operation this form of invention functions in a manner similar to the form of the invention hereinbefore discussed in connection with fluid flow rate control. In the present instance the rheostat 14 is of course calibrated in terms of temperature and the instrument 18 indicates regulatory changes in operation of the process which will be necessary to re-establish predetermined temperature conditions. The resistance of the elements 15 and 16 will vary directly as the process temperature provided that the resistance-temperature co-efficient of the resistance material used in said elements is positive. When such material is used the resistance of the elements 15 and 16 will increase when the process temperature increases and will decrease when the said temperature decreases. Since the total resistance of the element 16 is greater than that of the element 15, a change in process temperature will occasion a resistance differential between the arms A—D and B—D of the Wheatstone bridge, thus causing a flow of current between the points A and B. The resistance variation of the element 15 in response to process temperature changes is delayed, relative to the contemporary change in the element 16, by reason of the thermal insulation surrounding the thermo-well 35. The said thermal insulation retards the flow of heat to and from the thermo-well 35, and its function is analogous to that of the valve 34 in Figure II in thus occasioning a magnified response in the control system to process temperature changes.

While the invention has been described in connection with two specific adaptations thereof, it is to be clearly understood that no undue limitation as to form or application is intended thereby. Thus, the electric circuit forming a part of the apparatus has been illustrated by a Wheatstone bridge arrangement, but, other forms of electric potential dividers may be substituted therefor without deviating from the spirit of the invention. Further, the use of the apparatus for indicating, recording and/or controlling physical changes other than flow rate or temperature is contemplated and in such instances the devices illustrated in Figures 2 and 3 must necessarily take a modified form in accordance with the type of physical change concerned. All such devices must, however, incorporate therein some means for occasioning a response differential between the reactive sections of the electric potential divider directly associated with said devices. These and other modifications of the depicted and described form of the invention, which are logically concerned with its wide industrial application, are considered to be well within the scope thereof.

We claim.

1. Apparatus responsive to changes in a physical condition of a system communicating therewith, comprising a Wheatstone bridge, two variable resistance elements of unequal value adapted to be influenced by changes in said physical condition and connected one in each of two adjacent arms of said bridge, the ratio of the effective resistances of said elements being constant for any sufficiently maintained static value of said physical condition, and means for delaying the resistance-change response of one of said resistance elements to a change in said physical condition relative to the response of the other of said elements, whereby a change in said physical condition produces a potential difference across said bridge which is a function both of the extent and the rate of said physical change, and means for indicating said potential difference.

2. Apparatus responsive to changes in a physical condition of a system communicating therewith, comprising a Wheatstone bridge, two variable resistance elements of unequal value adapted to be influenced by changes in said physical condition and connected one in each of two adjacent arms of said bridge, the ratio of the effective resistances of said elements being constant for any sufficiently maintained static value of said physical condition, and means for delaying the resistance-change response of the smaller of said resistance elements to a change in said physical condition relative to the response of the larger of said elements, whereby a change in said physical condition produces a potential difference across said bridge which is a function both of the extent and the rate of said physical change, and means for indicating said potential difference.

3. Apparatus as claimed in claim 1 in which the two variable resistance elements have the same resistance-temperature coefficient and are exposed to the same temperature of the communicating system and influenced by changes therein, whereby temperature changes in said system will cause proportional resistance changes in said elements, and in which the said delaying means comprises a heat insulation adapted to cause a lag in the temperature change of the delayed element.

4. Apparatus as claimed in claim 2 in which the two variable resistance elements have the same resistance-temperature coefficient and are exposed to the same temperature of the communicating system and influenced by changes therein, whereby temperature changes in said system will cause proportional resistance changes in said elements, and in which the said delaying means comprises a heat insulation adapted to cause a lag in the temperature change of the delayed element.

5. Apparatus responsive to changes in a physical condition of a system communicating therewith, comprising a Wheatstone bridge, two variable resistance elements of unequal value adapted to be influenced by changes in said physical condition and connected one in each of two adjacent arms of said bridge, the ratio of the effective resistances of said elements being constant for any sufficiently maintained static value of said physical condition, means for varying the respective effective resistances of said variable resistance elements in response to changes in the physical condition of said communicating system, and means for delaying the resistance-change response of one of said resistance elements to a change in said physical condition relative to the response of the other of said elements, whereby a change in said physical condition produces a potential difference across said bridge which is a function both of the extent and the rate of said physical change, and means for indicating said potential difference.

6. Apparatus responsive to changes in a physical condition of a system communicating therewith, comprising a Wheatstone bridge, two variable resistance elements of unequal value adapted to be influenced by changes in said physical condition and connected one in each of two adjacent arms of said bridge, the ratio of the effective resistances of said elements being constant for any sufficiently maintained static value of said physical condition, means for varying the resistances of said variable resistance elements in response to changes in the physical condition of of said communicating system, means operating in conjunction with said first mentioned means for delaying the full resistance-variation response of one of said variable resistance elements to a change in said physical condition, whereby said change produces a resistance differential between two specified arms of said Wheatstone bridge, said resistance differential continuing during periods of physical change in said communicating system and being a function both of the extent and the rate of said physical change, and means for indicating said resistance differential.

7. Apparatus responsive to changes in a physical condition of a system communicating therewith, comprising a Wheatstone bridge, two variable resistance elements of unequal value adapted to be influenced by changes in said physical condition and thereby electrically unbalance said bridge, said resistance elements being connected one in each of two adjacent arms of said bridge, the ratio of the effective resistances of said elements being constant for any sufficiently maintained static value of said physical condition, a rheostat connected in one of the arms of said bridge and in series with one of said variable resistance elements for effecting electrical balance of said bridge, and means for delaying the resistance-change response of the smaller of said resistance elements to a change in said physical condition relative to the response of the larger of said elements, whereby a change in said physical condition electrically unbalances said bridge and produces a potential difference across said bridge which is a function both of the extent and the rate of said physical change, and means for indicating said potential difference.

8. Apparatus as claimed in claim 1 in which the two variable resistance elements are separately encased in receptacles containing mercury, the volume of mercury in said receptacles being exposed to and influenced by fluid volume changes in the communicating system, whereby changes in the rate of fluid flow of said system will cause proportional resistance changes in said elements, and in which said delaying means comprises a fluid flow control valve adapted to cause a lag in the mercury volume change of the delayed element.

9. Apparatus as claimed in claim 2 in which the two variable resistance elements are separately encased in receptacles containing mercury, the volume of mercury in said receptacles being exposed to and influenced by fluid volume changes in the communicating system, whereby changes in the rate of fluid flow of said system will cause proportional resistance changes in said elements, and in which said delaying means comprises a fluid flow control valve adapted to cause a lag in the mercury volume change of the delayed element.

LUIS DE FLOREZ.
EMMON BACH.